United States Patent [19]

Dodé et al.

[11] 4,114,565

[45] Sep. 19, 1978

[54] MILKING SYSTEM AND A VALVE THEREFOR

[75] Inventors: Peter Francis Dodé, Bramley Nr. Basingstoke; Michael Francis Hawkins, Reading, both of England

[73] Assignee: Gascoigne Gush & Dent (Agricultural) Limited, Reading, England

[21] Appl. No.: 715,216

[22] Filed: Aug. 17, 1976

[30] Foreign Application Priority Data

Mar. 25, 1976 [GB] United Kingdom .............. 12016/76

[51] Int. Cl.² .......................... A01J 7/00; F16L 37/28
[52] U.S. Cl. ................. 119/14.01; 251/149.1
[58] Field of Search ............ 119/14.01, 14.03, 14.46; 251/145, 146, 149.1; 285/137 R, 325

[56] References Cited

U.S. PATENT DOCUMENTS

| | | | |
|---|---|---|---|
| 2,779,608 | 1/1957 | Abbey | 251/149.1 |
| 2,949,276 | 8/1960 | Merritt et al. | 251/146 |
| 3,172,391 | 3/1965 | Norton | 119/14.18 X |
| 3,272,471 | 9/1966 | McCullah | 251/146 |
| 3,977,703 | 8/1976 | Curtis | 285/325 |

Primary Examiner—Hugh R. Chamblee
Attorney, Agent, or Firm—William R. Liberman

[57] ABSTRACT

The invention relates to a milking system.

The milking system of the invention includes a plurality of valves each of which is connected to a vacuum line and a milk conveying line at a plurality of spaced locations. Connectors are used which can be readily connected to and disconnected from the valves, each connector serving to supply vacuum from the vacuum line to operate a milking device positioned on a cow's udder and also serving to pass milk from the udder to the milk conveying line.

The invention also provides a novel valve for use in the milking system of the invention.

9 Claims, 5 Drawing Figures

MILKING SYSTEM AND A VALVE THEREFOR

BACKGROUND OF THE INVENTION

This invention relates to a milking system, and to a valve which may be used in such a system. The invention is particularly concerned with a milking system in which a cowshed is provided with a source of vacuum which is used to effect the milking operation, and milk is conveyed from the cowshed by a pipeline. Such a system enables the vacuum required to milk all the cows to be supplied from a single vacuum source and enables the milk from all the cows to be conveyed directly to a milk tank via the pipeline.

An object of the invention is to provide a milking system which enables a vacuum and liquid tight connection to be rapidly and easily made between a milking device positioned on the udder on an animal to be milked and vacuum and milk conveying lines.

SUMMARY OF THE INVENTION

According to the present invention there is provided a milking system for milking animals, comprising a vacuum line for connection to a source of vacuum, a milk conveying line for connection to a milk receiver, a milking device for connection to the udder of an animal to be milked, a plurality of valves each connected both to the vacuum line and the milk conveying line at a corresponding plurality of spaced locations, each valve comprising a body having separate closable milk and vacuum passages communicating respectively with the vacuum line and the milk conveying line, and a plurality of connector members adapted for ready connection to and disconnection from a selected one of the valves, each connector member having a first passage providing communication between the milk passage of the selected valve and an inlet for milk from the milking device, and having a second passage providing communication between the vacuum passage and an outlet for vacuum to pass to the milking device.

The invention also provides a valve having two separate passages therethrough, and a valve closure member movable between a position in which it blocks both passages and a position in which both passages are free, the said closure member being operable from the exterior of the valve.

DESCRIPTION OF THE PREFERRED EMBODIMENT

Figure 1:
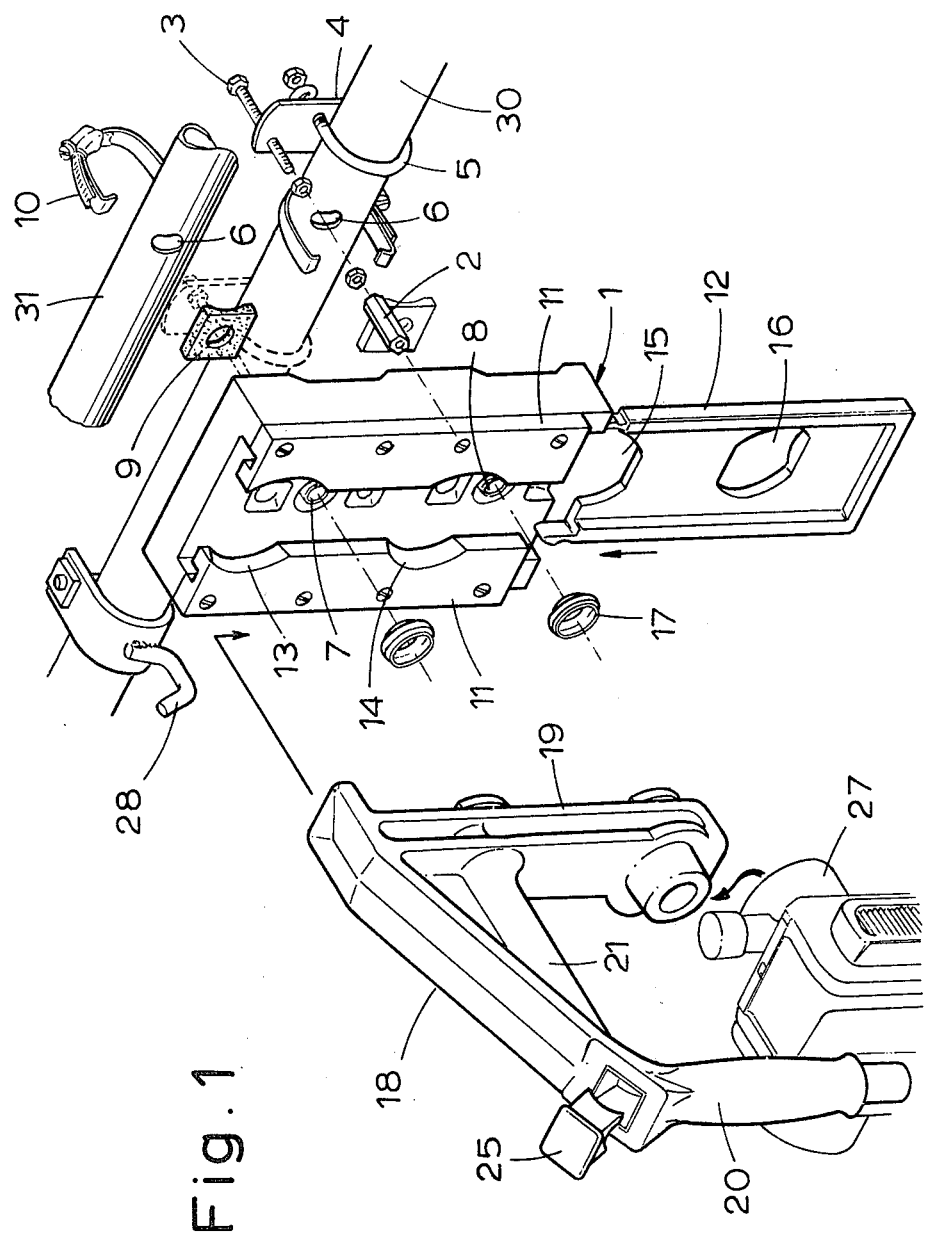
FIG. 1 is an exploded view showing part of an embodiment of a system according to the invention including a milk pipeline, a vacuum line, a valve, and a connector referred to below as a plug-handle.

As shown in FIG. 1, vacuum is supplied to a cowshed by a vacuum line 30, and milk is carried away from the cowshed by a milk line 31. These two lines run parallel to one another above the cows or other animals to be milked, and at intervals along the line valves 1 are secured to both lines. Only one of these valves is shown in FIG. 1. The valve 1 is mounted on the vacuum line by means of a pair of internally threaded hexagonal rods 2 [only one shown], each with a corresponding set screw 3 with two hexagonal nuts, plate 4, and U-bolt 5. Each rod two is received in an aperture in the valve and the screw 3 passes through the plate 4 and into the rod 2. The plate 4 is held in position on the vacuum line by the U-bolt 5.

Figure 2:
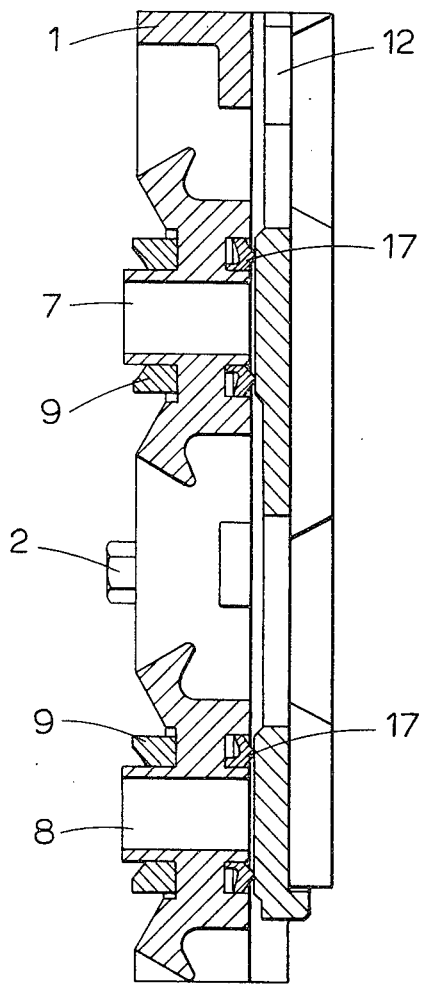
FIG. 2 is a section on a larger scale through the valve shown in FIG. 1.

The milk line and the vacuum line each have an aperture 6 in their walls, and passages 7 and 8 [see FIG. 2] in the valve 1 are aligned and in communication with these apertures. The junctions between the apertures 6 and the passages 7 and 8 are sealed by means of seals 9 which are clamped to the milk and vacuum lines by adjustable clips 10.

The valve is provided with a pair of longitudinally grooved side rails 11 behind which is received a slidable plate 12. The side rails are provided with two pairs of opposing part-circular cut-outs 13 and 14. The cut-outs 13 are spaced vertically from the passage 7 by an amount which is equal to the spacing of the cut-outs 14 above the passage. The plate 12 is provided with a lower lip which limits the upward movement of the plate, and has two cut-outs 15 and 16. When the plate is in its highest position the cut-outs 13 and 15 are aligned and the cut-outs 14 and 16 are aligned. The reason for this is explained below.

Seals 17 surround the outlets passages 7 and 8. Part of one of these seals is shown in more detail in FIG. 3. The characteristics of this seal are discussed below.

Figure 4:
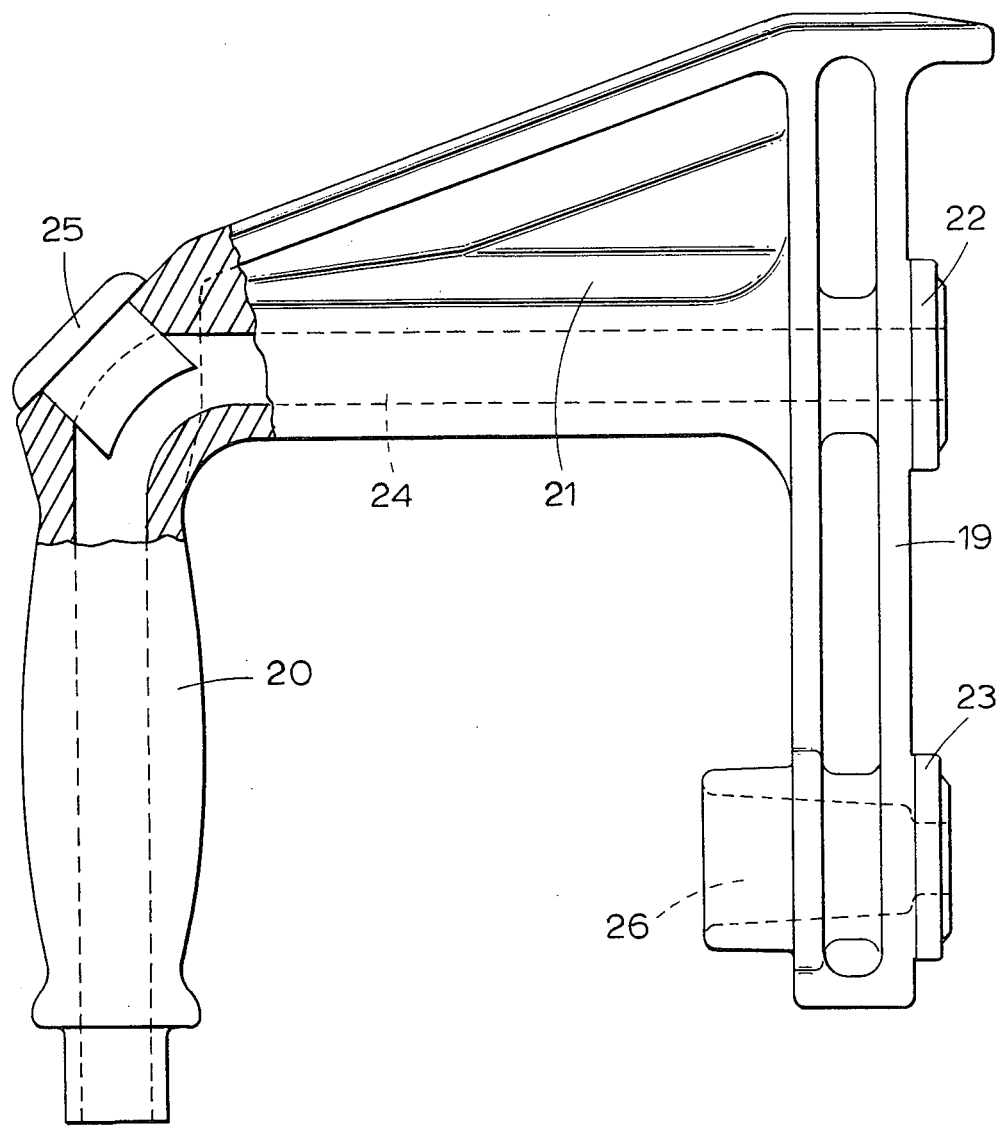
FIG. 4 is a section on a larger scale through the plug-handle shown in FIG. 1.

As is shown both in FIG. 1 and in FIG. 4, the system includes a plug-handle 18. The handle comprises a forward member 19, a handle portion 20, and a connecting member 21. The forward member carries two annular bosses 22 and 23. The bosses are of such a diameter and are so spaced apart that when the plug-handle is moved towards the valve the boss 22 passes through the cut-outs 13 and 15, and the boss 23 passes through the cut-outs 14 and 16. A right-angled channel 24 extends from the interior of the boss 22 through the connecting member 21 and through the handle portion 20. Access to this channel can be obtained if desired by removing a plug 25 located at the right-angle of the channel. A short channel 26 extends rearwardly from the interior of the boss 23. A pulsator 27 [shown in part] is connected to the channel 26, and the pulsator is itself connected to a milking device, known as a cluster, for placing on an udder of a cow. The channel 20 is also connected to the milking device for the purpose of receiving milk therefrom.

A hook 28 is secured to the vacuum line to provide somewhere on which the cluster can be hung when not in use.

Figure 3A:
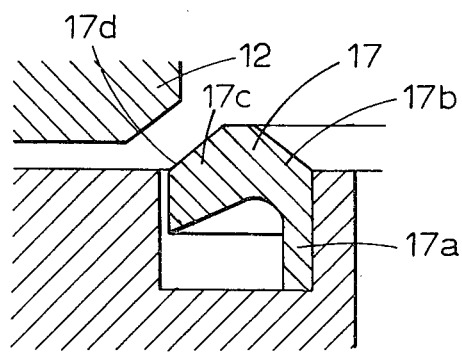
FIGS. 3a and 3b show two views of part of a seal used in the valve of FIG. 2.
Figure 3B:
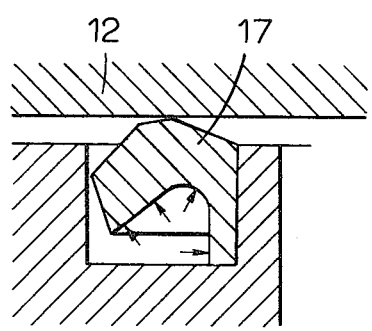

The operation of the milking system is as follows. The cluster is attached to a cow. [In practice there will be a number of clusters and a corresponding number of plug-handles and valves, but for simplicity the operation will be described with respect to one cluster]. The plug-handle is then moved into contact with the valve 11 so that the bosses 22 and 23 pass through the cut-outs 13, 15 and 14, 16 respectively. The plug-handle is then moved downwardly, causing the plate 12 to move downwardly also, until the bosses 22 and 23 are in alignment with the passages 7 and 8 respectively. The form of the seal 17 [FIGS. 3a and 3b] enables the sliding movement of the plate 12 to take place easily. It will be observed that the seal 17 comprises a first radially innermost, annular portion 17a, and second, intermediate, annular portion 17b, and a third radially outermost, annular portion 17c. The portion 17c has a bevelled surface 17d, and the portion 17b is undercut. The portion 17a extends further axially from the plate 12 than the rest of the seal. When the leading edge of the plate 12 engages the seal 17, the initial engagement is with the bevelled surface 17d which prevents pick-up of the seal. As the leading edge of the plate 12 continues to move across the seal the portion 17c flexes axially away from the plate. This flexing action is assisted by the fact that the section 17b is thinner than the section 17c. FIG. 3a shows the seal before engagement by the plate 12 and FIG. 3b shows the seal after engagement.

Vacuum in the vacuum line is thus communicated to the pulsator which applies a pulsating vacuum to the cluster, and the milk from the cow passes through the plug-handle and valve into the milk line under the action vacuum applied to the milk line. When the milking operation has finished, the plug-handle is moved upwardly and disengaged from the valve. The plate 12 then seals the passages 7 and 8.

What is claimed is:

1. A milk system for milking animals for use with a milking device for connection to the udder of an animal to be milked, comprising a vacuum line for connection to a source of vacuum, a milk conveying line for connection to a milk receiver, a plurality of valve assembly units each connected to and in flow communication with both the vacuum line and the milk conveying line at a corresponding plurality of spaced locations, each valve assembly unit comprising a body having separate milk and vacuum passages communicating respectively with the vacuum line and themmilk conveying line, and means connected thereto for opening and for closing said milk and vacuum passages, and a plurality of connector members adapted for ready connection to and disconnection from a selected one of the valve assembly units, each connector member having a first passage providing communication between the milk passage of the selected valve assembly unit and an inlet passage for milk from a milking device for connection to the udder of an animal to be milked, and having a second passage providing communication between the vacuum passage and an outlet passage for vacuum to pass to the milking device connected to the udder of the animal to be milked wherein said means connected thereto with each valve assembly unit is provided with a plate which has two openings therein, the plate being movable between a first position in which one opening communicates with the milk passage in the valve and the other opening communicates with the vacuum passage in the valve upon engagement of a connector member with a valve assembly unit, and a second position in which the plate closes both passages upon disconnection of a connector member from a valve assembly unit.

2. A system as claimed in claim 1, wherein each connector member is provided with a pair of bosses adapted to engage in a respective one of the said openings so as to enable movement of the plate between the two said positions to be effected by movement of the connector member.

3. A system as claimed in claim 2, wherein each valve assembly unit is provided with a pair of side members defining therebetween a guide track for receiving the said plate, the side members having a pair of cut-outs each aligned with a respective one of the openings in the said plate when the plate is in its second position and adapted to permit the bosses on a connector member to pass therethrough into and out of engagement with the said openings only when the plate is in its second position.

4. A system as claimed in claim 2, wherein one of the bosses surrounds an outlet from the said first passage in the connector member, and the other boss surrounds an inlet to the said second passage in the connector member.

5. A system as claimed in claim 3, wherein one of the bosses surrounds an outlet from the said first passage in the connector member, and the other boss surrounds an inlet to the said second passage in the connector member.

6. A system as claimed in claim 1, wherein a pair of seals is positioned on the valve for engagement with the said plate when in its second position to seal off the milk and vacuum passages in the valve assembly unit.

7. A system as claimed in claim 6, wherein each seal comprises a radially inner annular portion and a radially outer annular portion, the radially outer annular portion being adapted to flex axially with respect to the radially inner annular portion.

8. A system as claimed in claim 7, wherein the said radially inner annular portion and the said radially outer annular portion are connected by an annular intermediate portion of lesser thickness than the radially outer portion.

9. A system as claimed in claim 8, wherein the said radially outer annular portion is bevelled on that edge which is adjacent the said plate.

* * * * *